March 3, 1942.  R. F. SMITH  2,274,994
POWER TAKE-OFF
Filed Aug. 28, 1939
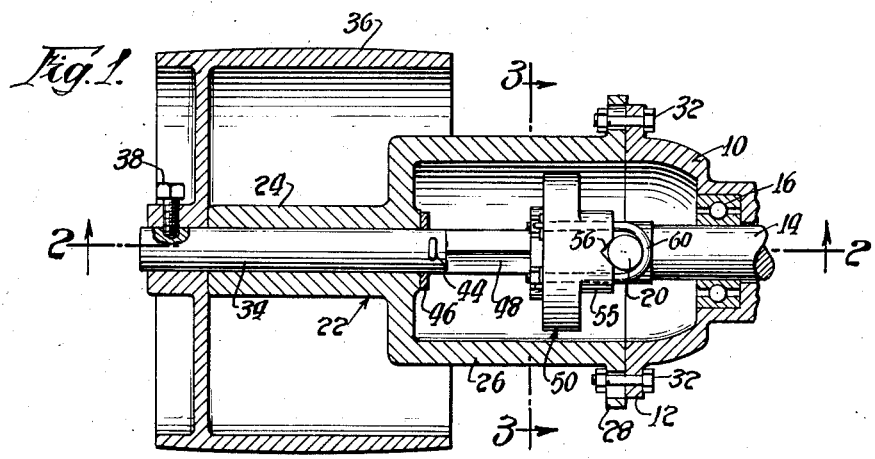
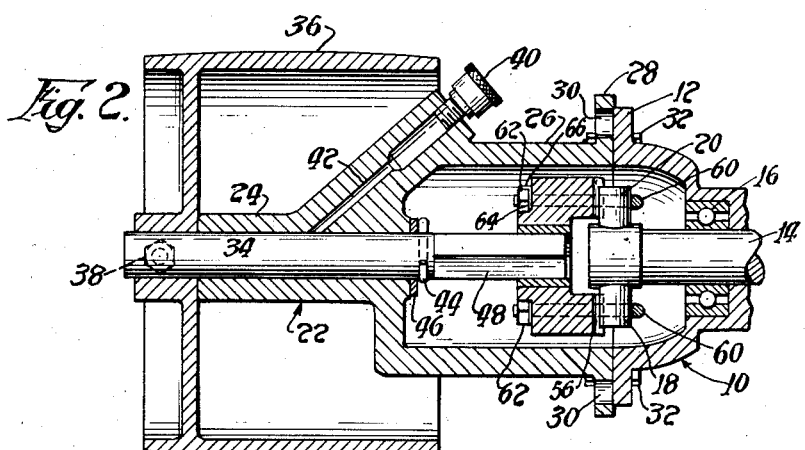
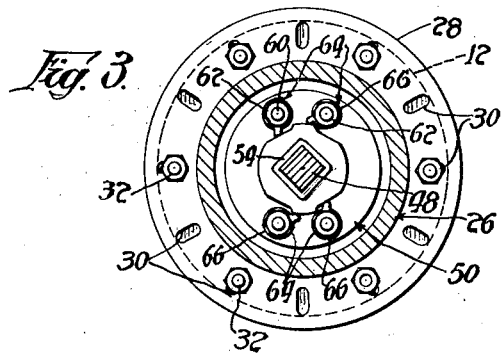
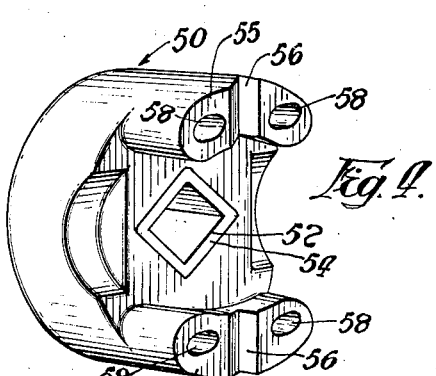
Inventor:
Ray F. Smith,
By Bair & Freeman
Attorneys.

Patented Mar. 3, 1942

2,274,994

UNITED STATES PATENT OFFICE 2,274,994

POWER TAKE-OFF

Ray F. Smith, Des Moines, Iowa, assignor to Ideal Manufacturing Co., Des Moines, Iowa, a corporation of Iowa Application August 28, 1939, Serial No. 292,302

3 Claims. (Cl. 287—1)

My invention relates to that class of devices utilized for adapting automotive engines to belt drive applications. More particularly, it relates to the type of device customarily used by attachment to the universal joint housing of an automotive engine.

An object of my invention is to provide such a belt power take-off of simple, durable and inexpensive construction.

A further object is to provide a power take-off which can be attached to an automotive engine in a very simple manner, so that no special mechanical knowledge or skill is necessary for a satisfactory installation.

Devices of the general class to which my invention belongs have been known and used for some time. The patent to Kurtz, No. 1,658,344, particularly Figure 3 thereof, shows a similar power take-off.

However, a feature which definitely distinguishes my device from such prior showings is my means for coupling the shaft of the power take-off unit to the shaft of the engine.

An object of this means is to provide for the differences in dimensions of the universal joint parts on different makes of automobiles, so that my power take-off can be applied to the engines from various makes of cars without the necessity for special parts or fittings in each case.

With these and other objects in view, my invention consists in the construction, arrangement and combination of the various parts of my device whereby the objects contemplated are attained, as hereinafter more fully set forth, pointed out in my claims and illustrated in the accompanying drawing, wherein:

Figure 1 is a horizontal longitudinal sectional view of a form of power take-off embodying my invention, together with parts of the automotive engine to which it is attached.

Figure 2 is a vertical longitudinal sectional view of the same on line 2—2 of Figure 1.

Figure 3 is a vertical transverse section on line 3—3 of Figure 1.

Figure 4 is an enlarged perspective view of the coupling member.

In the accompanying drawing I have used the reference numeral 10 to indicate a housing, which is the front part of the universal joint housing found adjacent the transmission on present day automobiles. The housing 10 is extended to form a flange 12. A shaft 14 passes through the housing 10, and may be supported therein by a ball-bearing 16. Shaft 14 ends in a pair of universal yoke pins, which I have designated as 18 and 20.

My take-off includes a body member indicated generally as 22, having an extended bearing portion 24, an enlarged end 26, and a flange 28. The flange 28 I make of substantial width, in a radial direction, to accommodate the flanges 12 on different makes of engines, which vary somewhat in diameter. In the flange 28 I form holes 30. They are elongated radially, and I make twelve of them, spaced equidistantly about the flange 28. I can thus fit flanges 12 which have any of the common number of fastening bolts, four, six, eight, etc.

I mount my take-off on the housing 10 by bolts 32, which pass through the flange 12 and through the appropriate ones of the holes 30 in the flange 28.

A shaft 34 passes through the bearing portion 24, and a pulley 36 is attached to the shaft by means of a set screw 38. A grease cup 40 communicates with the shaft for proper lubrication thereof by means of a passage 42 in the body member 22. The shaft 34 is retained in the bearing portion 24 by a cotter key 44. A washer 46 is interposed between the cotter key and the bearing portion 24.

The part of the shaft 34 which extends from the bearing portion 24 into the enlarged portion 26 is formed to square cross section, as at 48. This can be seen in the transverse sectional view of Figure 3.

The coupling member I have designated generally by the reference numeral 50. Its outline in end elevation is circular, as seen in Figure 3, and its general shape is best shown in Figure 4. At its center is a squared opening 52, adapted to fit the squared portion 48 of the shaft 34. The member 50 can be most cheaply made as a casting, but a hardened steel liner or insert 54 is provided, surrounding the opening 52, to reduce wear and to assure a long-lasting, tight fitting joint on the shaft portion 48.

In the longitudinally extended portions 55 of the member 50 I form V-cuts 56, and on each side of these cuts are holes 58, passing longitudinally through the member 50. Running through the holes 58 and spanning the V-cuts 56 are U-bolts 60, secured by nuts 62. The holes 58 are elongated in cross section, as will be observed in Figure 4, to accommodate some variation in the span of the U-bolts.

In the process of adapting an automotive engine for belt drive applications by means of my take-off, the housing and drive shaft of the conventional automobile, which extend rearwardly (to the left in Figures 1 and 2) from the flange 12, are removed.

The coupling member 50 is then removed from my power take-off assembly simply by slipping it off the square portion 48 of the shaft 34, and is attached to the drive shaft 14 of the automotive engine by engagement of the U-bolts 60 about the yoke pins 18 and 20. The U-bolts are tightened just sufficiently to hold the member 50 in place. Then the assembly of body 22 and pulley 36 is moved into position, the end of the squared portion 48 of the shaft is inserted into the square hole 52 in the member 50, and the bolts 32 are inserted to draw the flanges 12 and 28 together. The engine is turned over a few times by hand until the connection between the coupling member 50 and the yoke pins 18 and 20 centers itself. The bolts 32 are then removed and the pulley assembly is taken off to permit access to the nuts 62 on the U-bolts 60. The nuts are drawn up fairly snug, and the lock washers 64 are set by bending one of the tongues 66 up against a flat side of a nut 62. The pulley assembly is then put back in place, and the bolts 32 are drawn up tight.

It will be plain that the form of my coupling member 50 makes it highly adaptable for fitting various types of universal joints. Yoke pins of any diameter less than the span of the U-bolts 60 can be accommodated, and will be centered, regardless of size, in the V-cuts 56. The location of the yoke pins 18 and 20, with respect to the face of the flange 12, in a direction longitudinally of the shaft 14, varies considerably with different types and makes of engines. My squared shaft arrangement takes care of these variations admirably.

The coupling thus effected between the shaft 14 and the shaft 34 is entirely enclosed, so that the bearings, and particularly the bearing 16, will be protected from grit and other foreign matter. Such enclosure also prevents the escape of lubricant which would be harmful to the belt, especially a rubber belt. In addition, the personal hazard from projecting portions of the rotating coupling is eliminated.

I claim:

1. In means for operatively connecting a squared shaft with a power plant shaft having radially extending yoke pins, a coupling block, a square hole in said block adapted for slip fit on said squared shaft, and U-bolts extending through said block for engagement with said yoke pins.

2. In means for operatively connecting a squared shaft with a power plant shaft having yoke pins thereon, a coupling member comprising a disc, a hole centrally located therein, a hardened steel liner in said hole, said liner being dimensioned for slip fit on said squared shaft, longitudinal extensions on one face of said disc, radially extending slots in said extensions, and means for retaining said slots in engagement with the yoke pins on said power plant shaft.

3. In means for coupling a driven shaft to a driving shaft having radially extending members, a body member adapted to fit on said driven shaft, diametrically opposed radially extending V notches in one face of said body member, openings extending axially through said body member on each side of said V notches, and U-bolts passing through said openings and spanning said V notches, for retaining said radially extending members on said driving shaft in engagement with said V notches.

RAY F. SMITH.